Patented June 12, 1951

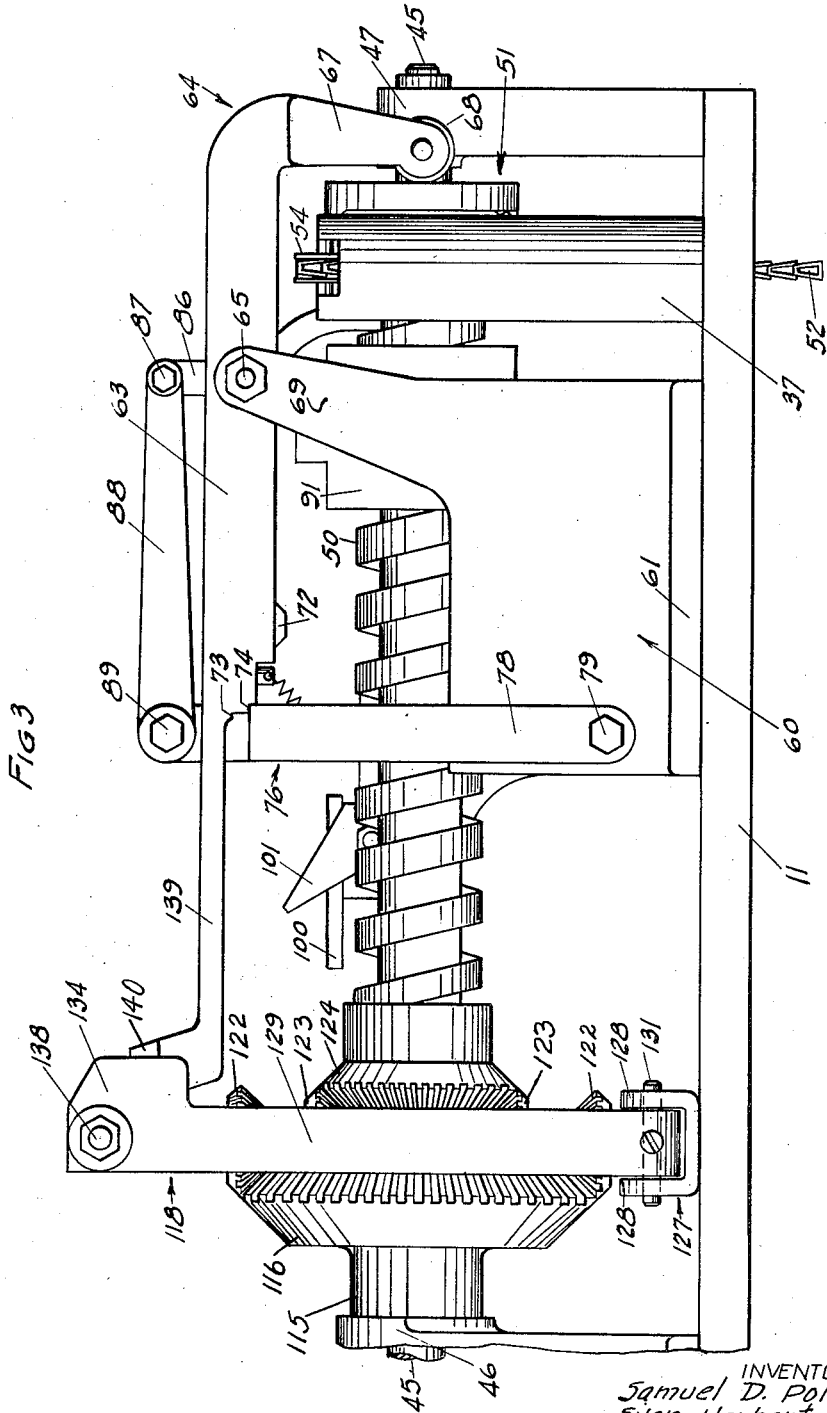

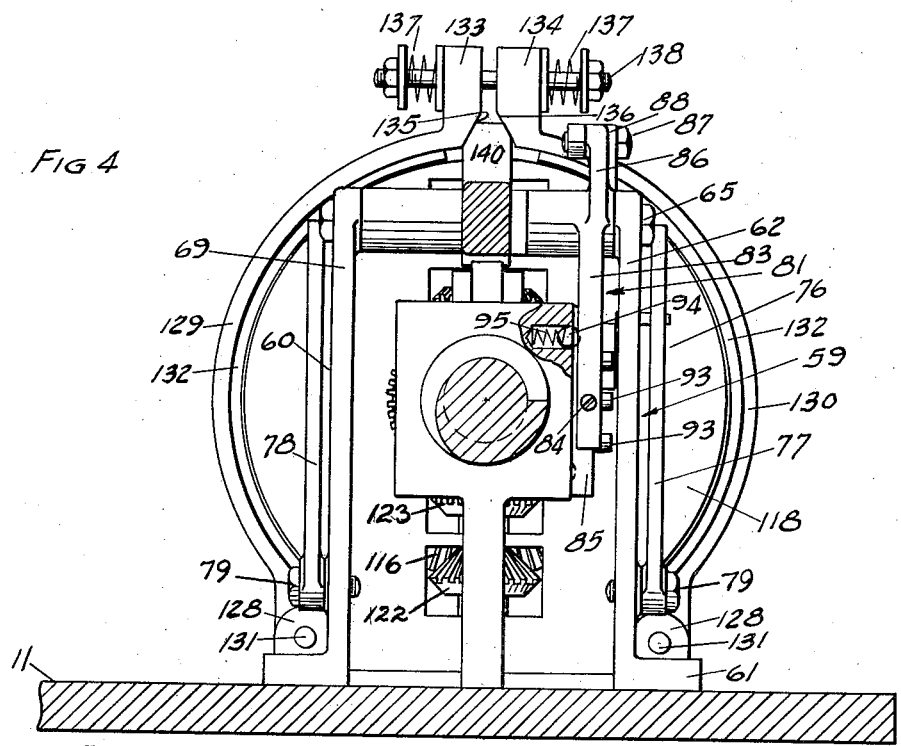
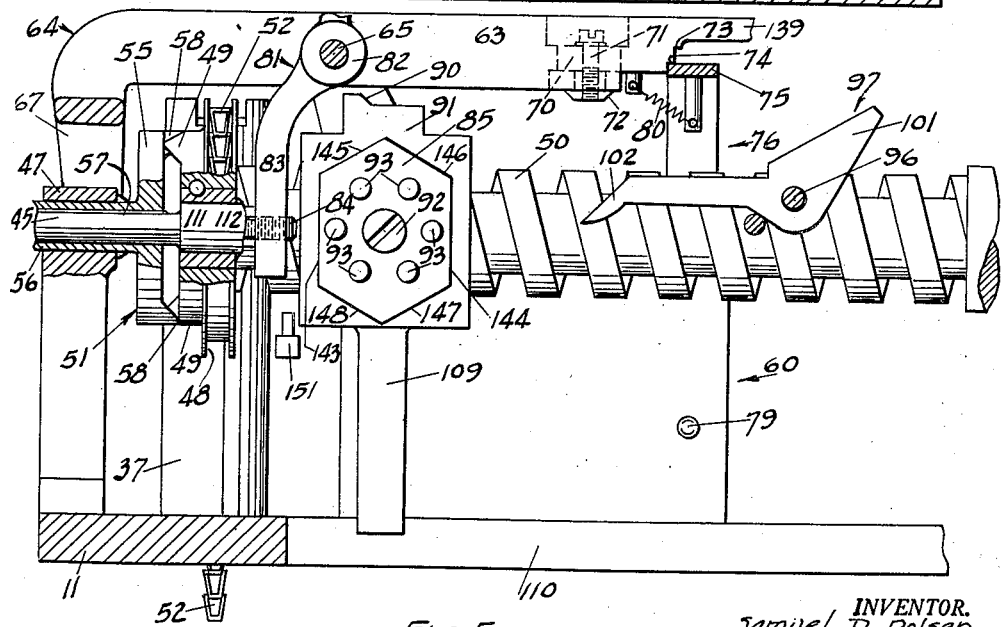

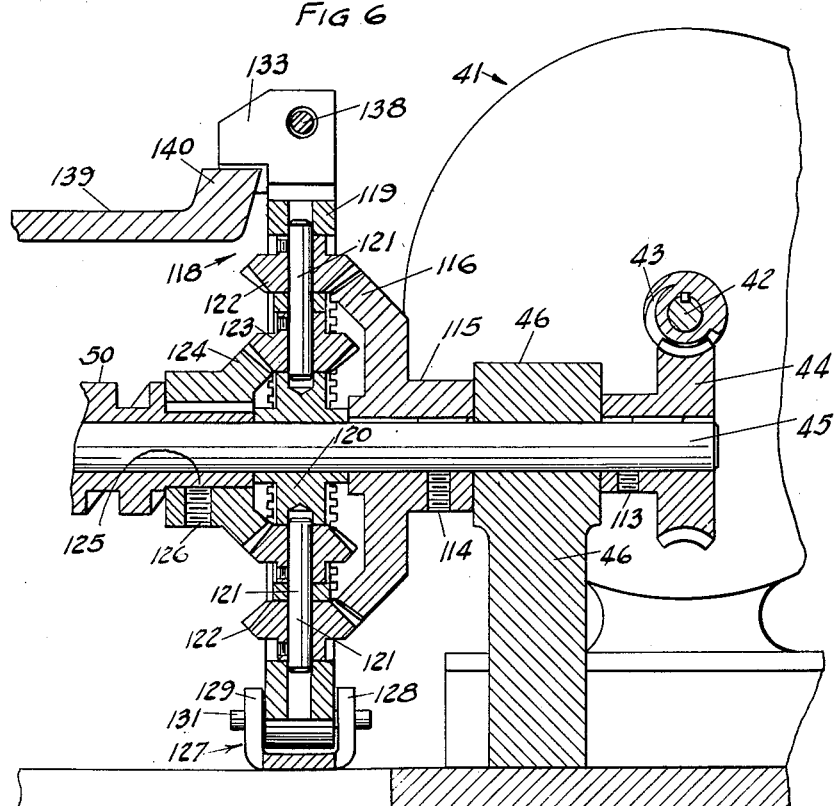
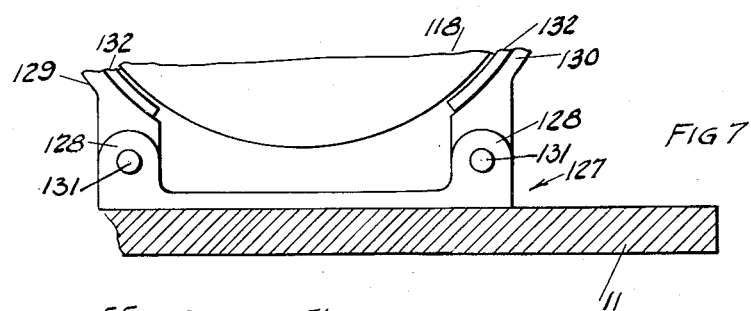
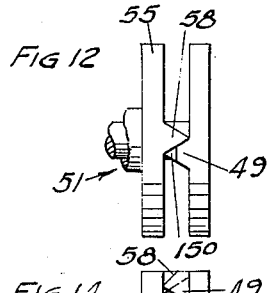
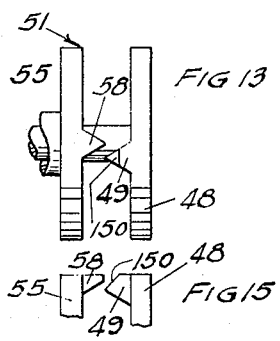
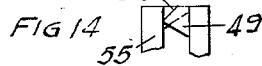
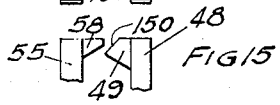

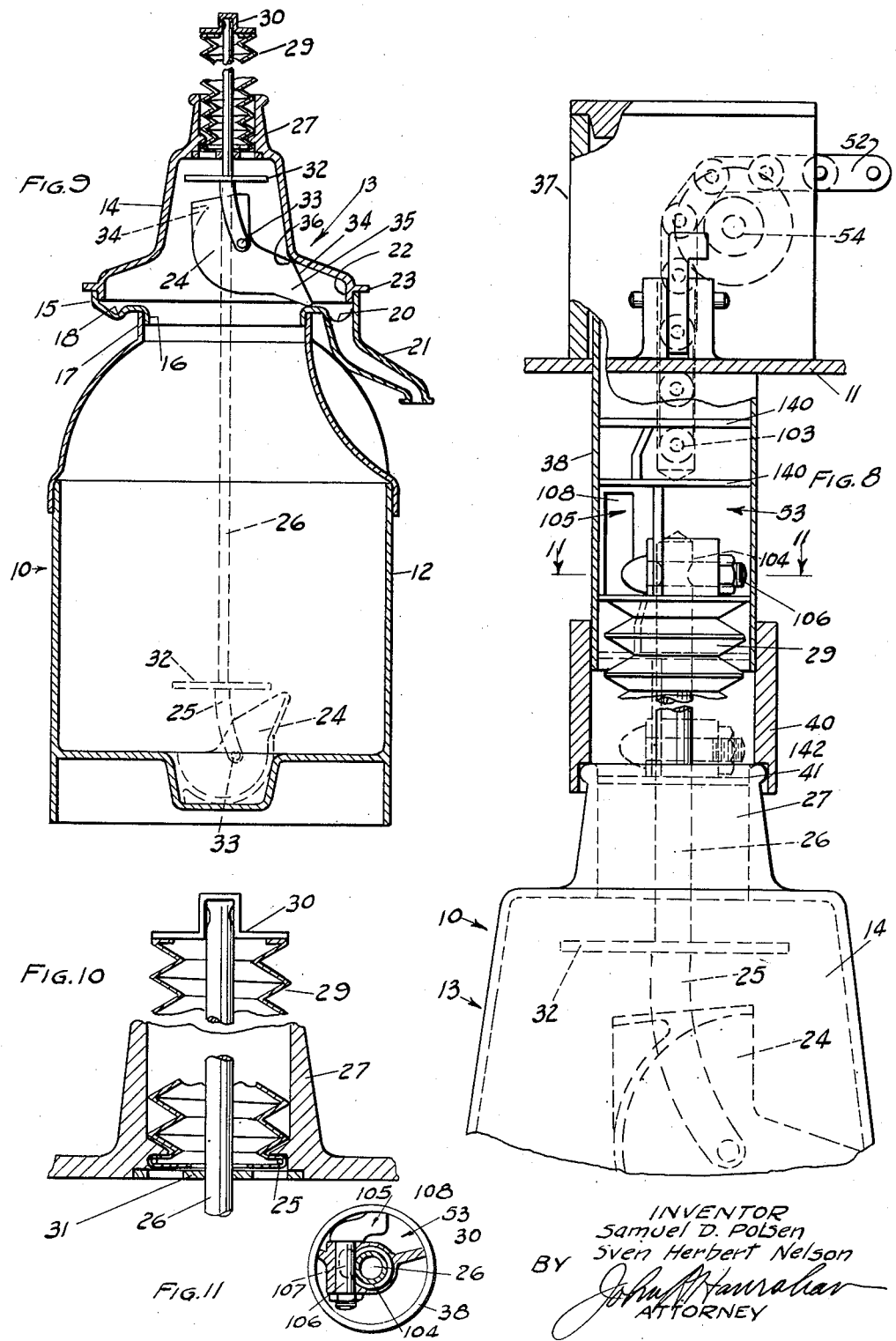

2,556,739

UNITED STATES PATENT OFFICE 2,556,739

MILK AGITATING AND DIPPING DEVICE

Samuel D. Polsen and Sven Herbert Nelson, Bridgeport, Conn., assignors of one-fourth to Blanche H. Polsen and one-fourth to Mildred P. Nelson, both of Bridgeport, Conn.

Application June 7, 1945, Serial No. 598,110

8 Claims. (Cl. 222—333)

1

This invention relates to new and useful improvements in dispensing and vending apparatus and has particular relation to an apparatus for dispensing or vending of liquids which tend to stratify and which therefore require mixing in order that the liquid dispensed at each operation of the apparatus will be of a uniform content.

Milk, when left in a container, will so arrange itself that the cream is in the upper portion of the container while the contents of the lower portion of the container is little more than water.

The present invention comprehends a liquid dispensing and vending apparatus in which a liquid to be dispensed may be automatically mixed as a step in each dispensing operation to the end that each such operation results in the dispensing of a liquid of uniform richness in the case of milk and the like and of uniform content in the case of any liquids which tend to stratify.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 3 is a rear elevational view of the same;

Fig. 4 is a sectional view taken as along the line 4—4 of Fig. 2;

Fig. 5 is a detailed sectional view taken as along the line 5—5 of Fig. 1;

Fig. 6 is a vertical sectional view through the righthand end portion of the device showing the motor and the gear drive and brake;

Fig. 7 is a detailed sectional view of the lower portion of the brake means and the mounting thereof;

Fig. 8 is a view partly in section and partly in elevation showing the connection of the lifting chain with a dipper;

Fig. 9 is a sectional view showing the dipper in dispensing position;

Fig. 10 is an enlarged detail sectional view showing a sealing means employed;

Fig. 11 is a sectional view as along the line 11—11 of Fig. 8;

2

Figure 1:
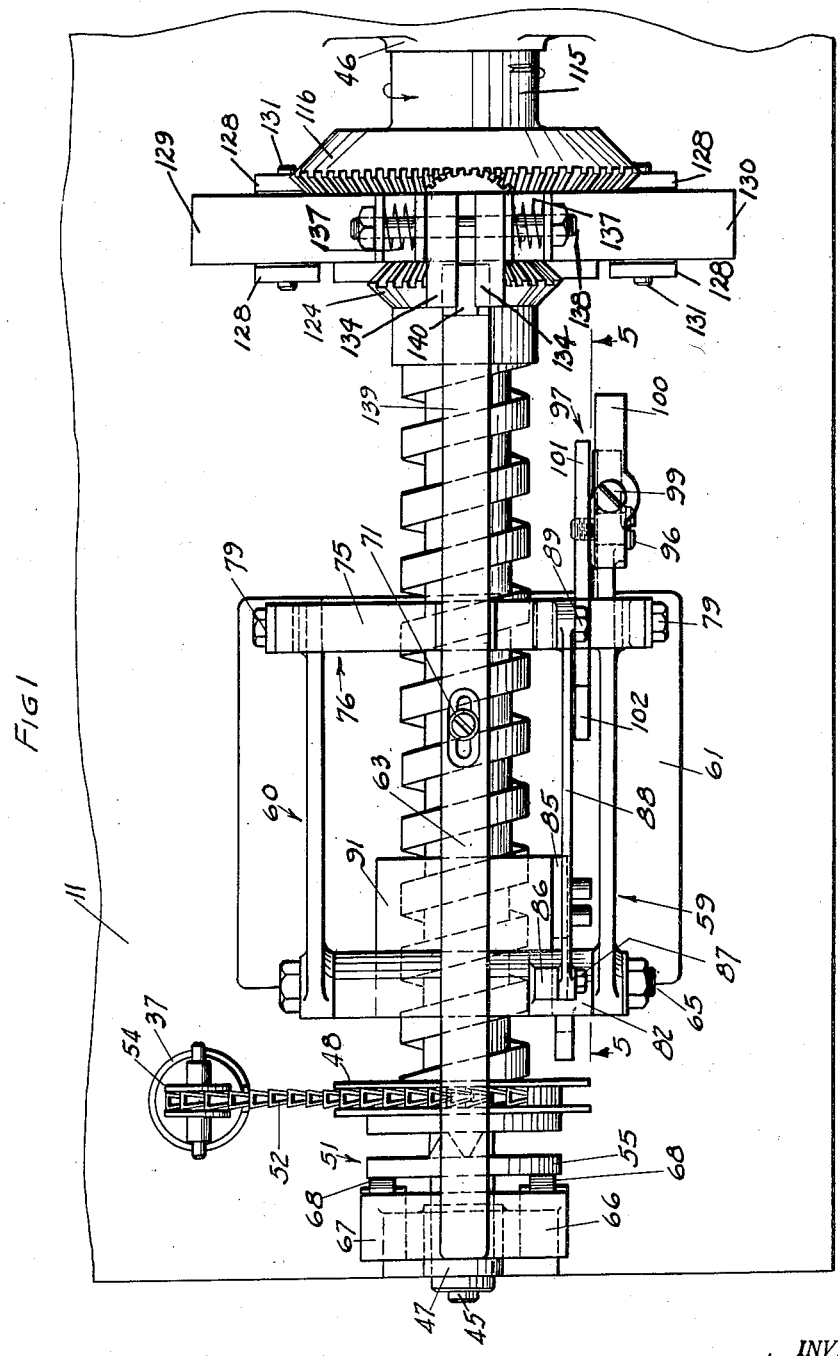
Fig. 1 is a top plan view of the apparatus of the invention, the driving motor being omitted.

Fig. 12 is a detailed plan view showing the clutch employed when in engaged position;

Fig. 13 is a similar view but with the clutch disconnected;

Fig. 14 is a detailed side elevational view showing a pair of teeth of the clutch when engaged; and Fig. 15 is a somewhat similar view but with the clutch teeth disengaged.

Referring in detail to the drawings, the apparatus as here shown is particularly adapted for the dispensing of milk from a container such as that generally designated 10 in Fig. 9. The operating mechanism of the invention is for the most part mounted on a base or plate 11 disposed above the container 10 and suitably supported independent of the latter. In actual use, the container and the operating mechanism mentioned are mounted in a refrigerator cabinet (not shown) of suitable design so that the contents of the container will be preserved against spoilage and so that the drink served by the dispenser will be cold and palatable.

Container 10 may comprise a body 12 open at its upper end and a closure or head 13 for the body. Head 13 includes upper and lower separable portions or parts 14 and 15 respectively. Lower part 15 comprises an annular depending flange 16, fitting within the neck portion 17 of the container and further includes a trough 18 also annular and encircling the said flange.

The bottom wall of the trough 18 inclines toward a well or depressed portion 20 from the bottom of which a discharge spout 21 extends to a convenient location. Any liquid placed in the trough will drain into the well 20 and from the latter through the spout 21. The upper part 14 of head 13 functions as a covering or closure for the open upper end of the container and also as a cover for the trough 18. This part of the closure includes a flange 22 entering the open upper end of the part 15 and further includes a radial flange 23 limiting movement of flange 22 into the part 15. Closure or head 13 is sealed in any suitable manner (not herein shown) to the body of the container and within such body is a dispensing dipper 24 carried by a bale 25 on the lower end of a rod 26.

Within a necklike portion 27 of the closure, a split spring ring 28 (Fig. 10) anchors one end of an expansible bellows-like structure 29 of paper or the like and comprising a seal. The upper or outer end of this seal 29 is closed as at 30 and disposed over the upper or outer end of rod 26. A spider 31 also in the closure comprises a guide for the rod 26 when the same is moved vertically to raise and lower the dipper 24. The container 10 is delivered to the storekeeper or the like with the dipper and its rod in the container and with the seal 29 in place over the rod as shown. Thus it will be understood that the container is sterilized, filled, and then sealed, all at the milk station or the like loading place and is not opened by the storekeeper or other persons at the dispensing station.

Attention is called to a plate 32 on the rod 26 immediately above and outwardly of the dipper and to the fact that the bale 25 is pivoted to the dipper at 33 and to the fact that the dipper has a socket or hollow place 34 in its under or lower side adjacent its rear end. Further, it is noted that the dipper 24 includes inclined edge portions along its pouring portion 35 and that such inclined edges are brought into engagement with a corner portion 36 of the closure or head 13 to cause tilting of the dipper to a pouring position as the dipper is moved into the hollow central portion of the closure.

At the upper side of the base 11 and cast integral therewith or otherwise suitably secured thereto is a tubular housing 37 opening at its lower end through the said base. A tube 38 of a length stopping short of the container 10 has its upper end portion secured in the housing 37. About the lower end portion of the tube 38 is a sleeve 40 and as shown in Fig. 8, this sleeve is adapted to receive a bead 41 at the upper end of the neck 27 of the container closure or head 13.

Mounted on the base 11 is an electric motor 41 (Fig. 6) on the shaft 42 of which is fixed a worm 43 meshing with a worm gear 44 fixed to a rather long shaft 45 supported at the upper side of the base as in bearings 46 and 47. Freely mounted on the shaft 45 is a structure including a reel 48, a clutch element or lugs 49 fixed to said reel and a worm or feed screw 50. As will later more clearly appear, the reel 48 comprises a movable operating means specifically a rotatable operating means for moving the dipper 24. The reel 48 and worm 50 may be integral or secured together but they turn as a unit and the reel at its side opposite that at which the worm is located is provided with the driving lugs 49 comprising clutch means as will appear.

A chain 52 or other flexible connecting or connector means has one end connected with the hub portion of the operating means or reel 48 and has its other end passing through the housing 37 and into the tube 38 and therein has such end secured to a coupling 53 (see Figs. 8 and 11). Chain 52 passes substantially horizontally from the operating means or reel 48 and over a guide pulley or roller 54 within the housing 37 and then downwardly through such housing.

A clutch element 51 includes a platelike body portion 55 at the inner side of bearing 47 and a sleevelike extension 56 extending through said bearing about the shaft 45. The clutch element is slidable in the direction of the length of the shaft but is turnable with the latter being secured thereto as by key 57. Driving lugs 58 extending from the inner face of the body 55 are adapted, when such body is in its most innermost position, to engage with the lugs 49 on the reel device 48 whereby to drive the latter.

The motor 41 always turns in the same direction and when the motor is operating shaft 45 is being driven and if the clutch element 51 is in its innermost position (as in Fig. 5) it will, through its lugs 58, drive the lugs 49 and thus the reel 48. Under these circumstances the reel is driven in a direction to wind the chain 52 thereon. This reel is the operating means directly concerned with the elevating of the dipper 24 by the winding up of the chain 52.

Mounted on the base 11 is a pair of vertical frame structures 59 and 60 supported as from a base 61 bolted or otherwise secured to the plate 11. Mounted on an arm 62 of the frame structure 59 (see Fig. 2) is the long arm 63 of a generally L-shaped lever 64. The mounting is about a pivot means 65 and is intermediate the ends of the arm 63.

The short arm of member 64 is bifurcated whereby it comprises a pair of arms 66 and 67 straddling the bearing 47 and at their lower ends carrying rollers 68 adapted to engage against the outer face of the body portion 55 of the clutch element 51. Lever 64 is actually mounted on a rod or pin 65 supported between the extension 62 of frame member 59 and extension 69 of frame member 60 (see Fig. 3). It will therefore be clear that as said lever is rocked in one direction on the pivot 65 its rollers 68 will be forced against the clutch element 51 pushing the latter toward the reel 48 and that as the lever is rocked in the opposite direction its rollers are carried away from the clutch element permitting the latter to move out of driving relation with the reel 48.

Intermediate its ends the arm 63 of the lever 64 is slotted as at 70 and carries a screw 71 adjustably mounting a camlike button 72. Clearly on the loosening of the screw, it, together with the button 72, may be shifted longitudinally of the arm 63 within the limits provided by the slot 70. Thereafter, on tightening of the screw, the button is secured in place. Just forwardly of the button 72 the arm 63 is stepped providing a pair of vertically spaced shoulders 73 and 74.

These shoulders are adapted to engage on the upper side of the connecting arm 75 of a yoke 76 generally in the form of an inverted U and including side arms 77 and 78 mounted at their lower ends on pivot means 79 supported by the frame members 59 and 60. A small coil spring 80 connects arm 63 and yoke 76 and is constantly tending to draw the latter toward the former. When the shoulder 74 is on connecting portion 75 (Figs. 2 and 5) lever 64 is so positioned that its rollers 68 are forcing the clutch element 51 into driving relation with the reel 48. When the shoulder 73 is engaging said connecting portion, lever 64 has moved to a position carrying its roller 68 outwardly with respect to clutch element 51 so that the latter is permitted to move out of driving relation with the reel.

Figure 2:
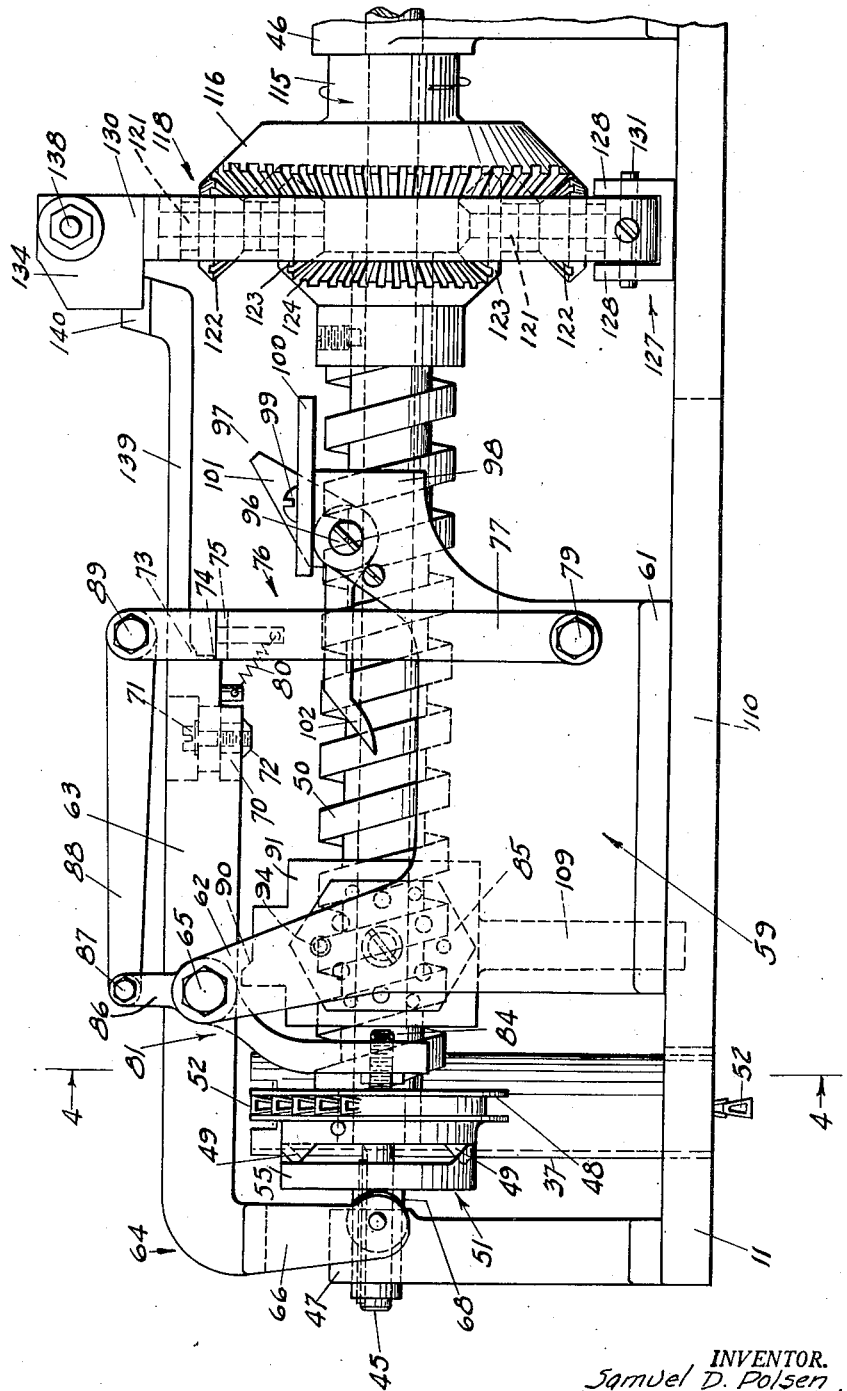
Fig. 2 is a front elevational view of the mechanism of Fig. 1.

Means are provided for tilting the yoke 76 from the position of Figs. 2 and 5 so as to permit of this shifting of the lever 64 and such means includes a lever 81 having a sleevelike intermediate portion 82 rockable on the pivot 65. The lower arm 83 of this lever is provided with an adjustable screw 84 adapted to be engaged by a plate 85 (later to be described in detail).

The upper arm 86 of lever 81 has pivoted to it at 87 the rear end of a link 88 whose forward end is pivoted to the yoke 76 at 89. Clearly when the screw 84 is engaged in a manner to force it rearwardly the entire lever 81 will be rocked about the pivot 65 exerting a forward thrust through the link 88 to rock the yoke 76 forwardly. This is only a slight movement but is sufficient to unseat the shoulder 74 and permit the lever 64 to rock so that its shoulder 73 drops onto the portion 75.

At the proper time a camlike extension 90 on a nut 91 (later to be described in detail) engages the button 72 and rocks the lever 64 in a direction to have its rollers 68 move the clutch element 51 inwardly into driving relation with the reel 48 and at the same time to raise the forward portion of lever arm 63 whereby to permit the spring 80 to rock the yoke 76 back into the position shown in Figs. 2 and 5 wherein the connecting portion 75 of such yoke is under and engaged by the shoulder 74 of the lever arm 63.

Nut 91 is mounted on the feed screw 50 to be fed forwardly and rearwardly therealong as the screw is turned in one direction or the other. Plate 85 is pivotally mounted on one side of the nut 91 as by screw 92. The plate carries a plurality of pins 93 projecting at its forward side and in its rear side it has a series of small sockets or depressions, there being a corresponding number of the pins and sockets. A ball or other rounded projection 94 (see Fig. 4) is carried by the nut 91 and a coil spring 95 constantly tends to move said ball out of the nut so that when one of the depressions or sockets comes opposite said ball it is snapped into such socket or depression.

A screw 96 pivots a tripping lever or member 97 on an extension 98 of the side frame member 59 and such tripping member serves to move the plate 85 at the proper times during operation of the machine. Mounted on the extension 98 as by screw 99 is a latching means 100. When this means is rocked in one direction it engages the arm 101 of the tripping lever 97 and rocks such lever in a direction to carry its forward pin engaging end 102 upwardly to an inoperative position above the level of the pins 93 of the plate 85. When the latching means is in the position of Figs. 1 and 2 the tripping lever 97 is horizontally disposed.

The chain 52 (see Figs. 8 and 11) or similar flexible connector means may be connected with the coupling 53 by any desired means although here the connection is made by a pin 103. In its lower end the coupling has a socket 104 receiving the upper end of the rod 26 and the portion 30 of the seal 29 which is disposed over such end of the rod. It is noted that the upper or outer end of the rod 26 is annularly grooved and a securing means, generally designated 105, is provided and includes a pinlike part 106 provided with a flat side 107.

Part 106 is mounted for turning movement about its longitudinal axis and for its manipulation a lever 108 is secured to one of its ends. This lever is moved to rock the part into a position with its flat side 107 disposed toward the socket 104 and then the rod and cover 30 may be entered into the lower end of the socket.

Thereafter the lever is rocked to turn the part 106 into position with its flat side 107 remote from the socket and with a portion of a round side entering such socket in a manner to crush a portion of the paper 30 into the annular groove in the end portion of the rod and to partly enter into such groove of the rod whereby to lock the outer or upper end of the latter to the coupling 53. Such coupling includes a series of platelike portions centering it in the tube 38.

Turning of the nut 91 on the screw 50 is prevented since the nut is provided with a depending post or extension 109 operating in a groove or slot 110 provided in the base 11. The motor 41, in addition to driving the reel 48, drives the screw 50, all as will now be described. To the desired end the reel 48 is fastened as at 111 (Fig. 5) to a sleevelike extension 112 of the screw 50.

Further (see Fig. 6), at the outer side of the bearing 46 a set screw 113 fixes the worm gear 44 on the shaft 45 and at the inner side of such bearing a set screw 114 fixes the hub 115 of a relatively large bevelled gear 116 to the shaft 45. On such shaft is turnably mounted a carrier or pulley-like device 118 between the rim 119 and the hub 120 of which are mounted a pair of pins 121, each carrying an outer bevelled pinion 122 and an inner bevelled pinion 123. Such inner bevelled pinions mesh with a bevelled gear 124, the hub portion of which is fixed to a sleeve-like extension 125 of the worm or feed screw 50 by a screw 126.

Mounted on the base plate 11 below the carrier 118 is a bracket 127 having pairs of upstanding ears 128 towards its ends. Between such ears are disposed the lower end portions of a pair of brake shoes 129 and 130 and such ends are pivoted to the ears as by pins 131. The inner surface of brake shoes 129 and 130 are lined with a friction material as leather 132 or other friction material. At their upper ends and above the pulley the brake shoes 129 and 130 include extensions 133 and 134 on their inner surface provided with inclined or bevelled surfaces as at 135 and 136. Coil springs 137, mounted on a bolt 138 passing through the lugs or extensions 133 and 134, are constantly tending to force such extensions toward one another and clamp the brake shoes against the rim 119 of the carrier so as to hold the latter against turning movement.

An extension 139 of the lever arm 63 carries an inclined or wedge-shaped piece 140 entering between lugs 133 and 134. This wedge so functions that when the lever 64 is in the position of Figs. 2 and 5 with its rollers 68 holding clutch element 51 in clutching relation with the reel 48 the extension is in an upper position and is functioning by wedging against the inclined surfaces 135 and 136 to force the lugs or extensions 133 and 134 and thus the brake shoes 129 and 130 apart or outwardly with respect to one another so that the friction pads of such brake shoes are not engaging the rim of carrier 118. However, when the screw 84 is engaged to rock the lever 81 and tilt the yoke 76 the lever arm 63 changes position and its wedge 140 moves downwardly to an inoperative position with respect to lugs 133 and 134. Now the springs 137 force the brake shoes toward one another bringing their friction pads 132 into engagement with the rim of the carrier or pulley-like device 118.

When the mechanism is to be put into use a sealed container is placed below the lower end of the tube 38 which is shown in Fig. 9 as of such length with relation to the base 11 and the top of the container as to stop short of the bead 41 about the upper end of the closure neck 27. At this time the container is sealed and the dipper 24 is at the bottom of the container and the rod 27 has its upper end in the neck portion of the closure 13 and such end of the rod is enclosed by the seal or bellows 29.

Now the flexible means or chain 52 is unwound from the operating means or reel 48 until the lower portion of the coupling 53 is below the lower end of the tube 38 and partly within the neck of the container, as shown by the dotted lines in Fig. 9. It will be noted that the socket 104 is about the upper end portion of the rod and the portion 30 of the seal. At this time the key 108 is exposed below the lower end of the tube 38 as the sleeve 40 is in a raised position. Therefore, the key 108 is swung to a substantially horizontal position with the cutout or flat side 107 of pin 106 facing the socket so that the rod and the cover 30 may freely enter the socket.

Then the key is swung to a substantially vertical position as shown and a portion of part 106 enters the groove in the rod 26 and locks the latter to the coupling as previously explained. Attention is called to the fact that during this time the upper flanges 141 of the coupling are within the tube 38 so that the coupling is kept in proper line and it will be clear that when the entire coupling is within the tube its flanges serve to keep the coupling aligned and against becoming tilted or wedged in the tube.

After the dipper rod 26 is secured to the coupling 53 as described the sleeve 40, which up until this time has been in an elevated out of the way position, is lowered into the position of Fig. 8 with its shoulder 142 resting on the upper end of the neck of the container closure. This sleeve keeps the container and the tube aligned and further serves to protect the paper or other disposable seal or bellows 29 in its portion that is exposed between the container and the lower end of the tube 38 during use of the machine.

Plate 85 is movable with the nut 91 as above set forth and such plate includes edges 143 and 144 spaced a shorter distance from the pivot screw 92 than are the edges 145, 146, 147 and 148 of the plate. At the end of a dispensing operation the dipper 24 is substantially in the full line position of Fig. 9. The motor is stopped and the lever 64 is in the position of Figs. 1 and 2 so that the clutch element 51 is in clutching relation with the reel 48 and the latter is prevented from turning since it is directly geared back to the motor 41.

Also at this time the nut 91 is in the position of Figs. 2 and 5 with either its side 143 or its side 144 toward but slightly spaced from the screw 84. The machine is started into operation, preferably by coin controlled means, and here it is again noted that the motor 41 always drives in the same direction. As the motor is started into operation it drives the feed screw 50 and the reel 48 further feeding the nut 91 toward the screw 84 and further winding the chain 52 onto the reel. This latter action results in a further slight tipping of the dipper but that is immaterial since the dipper has already poured its contents into the trough and out through the spout.

The former action however, that is the further movement of the nut 91, results in the edge 143 of the nut engaging the screw 84 to rock the lever 81 and move the yoke 76 so as to permit the arm 63 of the lever 64 to rock downwardly. This releases clutch element 51 and also releases the brake shoes 129 and 130 so that they are drawn in against the rim of carrier 118. Now the shaft 45 is free of the reel 48 and the drive is through the bevelled gear 117 which rotates the pinions 122 and through the shafts 121 the pinions 123 which in turn drive the smaller bevelled gear 124 fixed on the screw 50.

However, the direction imparted to the screw by this drive is the reverse to that in which it was driven when the clutch 51 was coupled with the reel (as will be explained) so that screw 50 is now driven in a direction to feed the nut 91 toward the tripping means 97 and to rotate reel 48 in a direction to unwind the chain 52 therefrom to lower the dipper in the container. This reverse movement of the reel 48 is more rapid than the movement which wound the chain thereon as the motor 41 is of the constant speed type but the drive to the feed screw and thus to the reel is now down through the smaller gear 124. This however, is a matter of selection of gear sizes and the ratio may be as desired and it may be arranged to have a faster upward movement of the dipper than a downward movement thereof, should such be desired.

When the dipper reaches the bottom of the container the nut 91 has carried the plate 85 over to such position that one of the pins 93 has engaged the cam or bevel end 102 of the tripping lever 97 so that the plate 85 will be turned and positioned with its surface 145 toward the screw 84. Additionally, during the return movement of the nut, its cam surface 90 engaged the button 72 rocking the lever 64 about its pivot 65 to force clutch element 51 into clutching relation with the reel 48 and also causing the forward end of the lever extension 139 to work against the inclined surface 135 and 136 so as to spread the brake shoes 129 and 130.

Immediately, element 51 is in clutching relation with the reel 48 the drive has changed so that the reel is being rotated in a direction to wind the chain thereon and raise the dipper. Now the drive is through shaft 45, to clutch element 51, to the reel 48. The latter is fixed to the screw 50 and the screw is fast to the smaller bevelled gear 124. Such gear is in mesh with the bevelled pinions 123 on the same shafts with the bevelled pinions 122 with which the large bevelled gear 116 meshes.

Since bevelled gear 116 is also fixed to the shaft 145 by the screw 114 the carrier 118 and all of the gears associated therewith rotate as a unit about the shaft 45 and the small bevelled pinions 122 and 123 merely move around about the shaft with the large gears and do not rotate on their own axis. The rate of drive of the reel and the feed screw during this operation is exactly the rate of rotation of the shaft 45 since there is no intervening gear ratio.

When the cam 90 of the nut engages button 72 and rocks the lever 64 to the position of Figs. 2 and 5, the reverse movement on the winding movement of the reel began immediately through the drive just described. Therefore, the screw 50 again feeds the nut 91 toward the lever in Fig. 2 but this time the surface 145 of the plate 85 is facing the screw 84 and such surface of the plate is a greater distance from the pivot screw 92 than was the surface 143.

Therefore, after a somewhat shorter movement the surface 145 engages screw 84, rocks the arm 81, shifts the yoke 76 and releases the lever 64 so that it rocks on its pivot 65 carrying its rollers 68 outwardly to release the clutch element 51 and to lower the end 140 of the lever extension 139 to permit the brake shoes to again engage the rim of the carrier 118. Now the drive is, as first described, through gear 116 to gear 124 and the dipper is lowered in the container and the nut 91 fed towards the right and it again engages the button 72 and rocks lever 64 back to the position of Fig. 2. This again couples element 51 with the reel although during the feed movement one of the pins 93 engaged the tripper part 102 again shifting the plate 85 so that its surface 146 faced the screw 84.

Therefore, the return movement or the return feed of the nut again raising the dipper in the container is limited. At the end of the return movement the surface 146 of the plate engages screw 84, reverses the direction of movement of the reel and the nut to again raise the dipper and return the nut toward the right in Fig. 2. Now when the plate 85 is again shifted by engagement of one of its pins 93 with the portion 102 of the tripper, the short edge 144 of the plate is towards the screw and on the next return movement of the nut the plate does not engage the screw until the nut has made a rather long journey and the dipper has been elevated to the dispensing position of Fig. 9. At this time the nut is positioned as in Fig. 2 and when the dipper has been raised to the mentioned position any suitable means opens the switch 131 stopping the motor 41.

A complete cycle of operation including three lowerings of the dipper into and through the contents of the container and two elevating movements, of which the second is a dispensing movement, have been described. The plate 85 is fed one step at a time so that its sides 143 and 144 are used or are facing the screw 84 at each dispensing operation while its sides 145 and 146 control the machine for mixing movements between a pair of dispensing operations and its sides 147 and 148 control the machine for mixing movements between the next two dispensing operations. Clearly the number of sides on the plate may be varied.

It is desired that the machine stop with the dipper in a raised position since then if there is a long period between operations the initial movement of the dipper will be a plunge downward through the cream which may have gathered at the top of the container. This initial plunge will break up the solid cream formation and thereafter the mixing strokes will serve to thoroughly mix the contents of the container. The container does not fall down in the contents but is rapidly fed downwardly therein so that there is no banging of the dipper against the bottom of the container. When the machine is in active use, as when a line of customers are waiting to be served, the lever 100 is operated to lock the tripping device 97 in an inoperative position whereby one of the short sides 143 and 144 of the plate 85 remains in position exposed to the screw 84 so that each operation of the machine is a dispensing operation.

The gear means including gears 116 and 124 and the intervening small pinions 122 and 123, together with the carrier 118, provide means whereby the motor may be continuously operated in the same direction and yet the direction of movement of the reel and the screw 50 reversed. Additionally, it provides means whereby various gear ratios may be employed so that the dipper may be raised at one speed and lowered at another. During the raising or elevating of the dipper the brake shoes 129 and 130 are open but during the lowering operation they are closed to hold the pulley stationary so that the gear ratio becomes effective to permit of more rapid lowering of the dipper.

Chain 52 is of a greater length than is actually needed to lower the dipper to the bottom of the sump. Thus, when the dipper is lowered and reaches the bottom of the sump, the chain continues to unwind while the dipper remains stationary. Then as the direction of the reel is reversed, its initial function is to take up the slack in the chain while the dipper remains in place. This feature is of importance only when the container is substantially empty. At such time the dipper remains stationary in the sump for a brief time to permit the liquid to drain into the dipper so that a full dipper is discharged even when the container is about empty. Under these same conditions the positive down feed of the dipper provides against the dipper falling and banging against the bottom of the container.

Attention is also directed to the construction of the lugs 58 and 49 of the clutch element and the reel. In Figs. 12-14 it will be noted that lugs 49 are cut down or bevelled on their upper surfaces toward their free ends as at 150. Thus the actual free ends or points of these lugs are below the points or free ends of the lugs 58. In addition, each lug, when viewed in plan, is wedge-shaped. Therefore, when the clutch element 51 is moved toward the reel 48 the actual ends of lugs 58 can never abut and lock or bind against the ends of lugs 49, should the lugs happen to engage while in alignment lugs 58 will cam against surfaces 150 of lugs 49 and ride past them into positions overlapping and in proper driving relation therewith. This insures proper functioning of the clutch element 51 with relation to the reel 48 at all times.

Having thus set forth the nature of our invention, what we claim is:

1. In a liquid dispensing apparatus, a container, a dipper in said container, a flexible connector, a coupling securing one end of said connector to the dipper, a reel, means securing the other end of said connector to the reel, an electric motor and gear train including gear means to rotate said reel in one direction to wind the connector thereon and elevate the dipper in the container, said gear train including gear means operable by said electric motor after predetermined movement of the dipper to drive said reel in the opposite direction to unwind the connector therefrom and lower the dipper in the container, and means then operable to render the first-mentioned gear means again operable to rotate the reel in the first mentioned direction to wind the connector thereon and elevate the dipper to a discharge position.

2. In a liquid dispensing apparatus, a container, a dipper in said container, a shaft, an electric motor and gear train for rotating said shaft in one direction, an operating means freely turnable about said shaft, a connector secured at one end to said dipper and at its other end to said operating means, clutch means for driving said operating means from said shaft when the latter is rotated in said one direction to raise the connector and move the dipper upwardly in said container, and means whereby said electric motor and gear train thereafter drive said operating means in the opposite direction to lower the connector and move the dipper downwardly in the container.

3. In a liquid dispensing apparatus, a container, a dipper in said container, an electric motor, a gear train including a gear means operable by said motor for raising the dipper in the container, said gear train including other gear means then operable by said motor for lowering the dipper in the container, said other gear means of a different ratio whereby to lower the dipper at a rate of speed different from that at which the dipper was raised in the container, and each of said means including means whereby the motor raises and lowers the dipper while the motor is operating in a single direction.

4. In a liquid dispensing apparatus, a container, a dipper in said container, a shaft, an electric motor connected to drive said shaft, a reel turnable on said shaft, a flexible connector secured at one end to said dipper and at its other end to said reel, means for driving the reel from the shaft to wind up said connector and move the dipper to discharge position, means then operable to release the reel from the shaft and to open the circuit of the motor, and other means connecting said reel with said motor whereby the latter holds the reel against any such movement as to permit of unwinding of the flexible connector therefrom whereby the motor holds the dipper in discharge position.

5. In a liquid dispensing apparatus, a container, a dipper in said container, a connector, a coupling securing one end of said connector to the dipper, an operating means, means securing the other end of the connector to said operating means, means to move said operating means to raise the dipper in the container, power means to move said operating means in the opposite direction following the predetermined raising of the dipper in the container to move the dipper downwardly in the container, means then operable to render the first mentioned means again operable to move the operating means a greater distance and raise the dipper to a discharge position, and means whereby both the means for raising the dipper and the means for lowering the dipper are operated by an electric motor having a single direction of movement.

6. In a liquid dispensing apparatus, a container, a dipper in said container, a shaft, a feed screw on and turnable about said shaft, a reel fixed to said feed screw, a flexible connector connected at one end to the dipper and at its other end to said reel, means for rotating the reel from the shaft to wind up said connector and raise the dipper in said container, means then operable to release the reel from the shaft, means then operable to drive said feed screw and thus said reel in the opposite direction to lower the dipper in the container, a nut on the feed screw and movable along the same in directions depending on the direction in which the screw is rotating, and means engageable by said nut operable to disconnect the means for rotating the reel from the shaft on predetermined movement of the nut in one direction.

7. In a liquid dispensing apparatus, a container, a dipper in said container, a shaft, a feed screw on and turnable about said shaft, a reel fixed to said feed screw, a flexible connector connected at one end to the dipper and at its other end to said reel, means for rotating the reel from the shaft to wind up said connector and raise the dipper in said container, means then operable to release the reel from the shaft, means arranged for actuation by said last named means to drive said feed screw and thus said reel in the opposite direction to lower the dipper in the container, a nut on the feed screw and movable along the same in directions depending on the direction in which the screw is rotating, means engageable by said nut operable to disconnect the means for rotating the reel from the shaft on predetermined movement of the nut in one direction, and other means operable by said nut to again connect the means for rotating the reel from the shaft on predetermined movement of the nut in the opposite direction.

8. In a liquid dispensing apparatus, a container, a dipper in said container, a shaft, a feed screw on and turnable about said shaft, a reel fixed to said feed screw, a flexible connector connected at one end to the dipper and at its other end to said reel, means for rotating the reel from the shaft to wind up said connector and raise the dipper in said container, means then operable to release the reel from said last named means, means then operable to drive said feed screw and thus said reel in the opposite direction to lower the dipper in the container, a nut on the feed screw and movable along the same in directions depending on the direction in which the screw is rotating, means engageable by said nut operable to disconnect the means for rotating the reel from the shaft on predetermined movement of the nut in one direction, said means for driving said shaft and said screw comprising an electric motor operable in but a single direction, a bevelled gear on said shaft, a bevelled gear on said feed screw, a carrier about the axis of said shaft and located between said bevelled gears, bevelled pinions mounted by said carrier and meshing with and capable of establishing a driving connection between said bevelled gears, said carrier freely rotatable about the axis of said shaft whereby the carrier, bevelled gears and bevelled pinions may all rotate as a unit about the axis of the shaft for driving of the reel in one direction, and brake means adapted to hold said carrier against turning movement whereby the bevelled gear on the shaft drives the bevelled gear on the feed screw through said bevelled pinions and the feed screw and reel are driven in the opposite direction.

SAMUEL D. POLSEN.
SVEN HERBERT NELSON.

REFERENCES CITED

The following references are of record in the file of this patent:

UNITED STATES PATENTS

| Number | Name | Date |
|---|---|---|
| 1,304,305 | Geier | May 20, 1919 |
| 1,494,631 | Roberts | May 20, 1924 |
| 1,766,625 | Geary | June 24, 1930 |
| 1,780,475 | Gold | Nov. 4, 1930 |
| 1,855,444 | Fey | Apr. 26, 1932 |
| 1,907,619 | Fraunhofer | May 9, 1933 |
| 1,960,389 | McFerran | May 29, 1934 |
| 2,009,191 | Buckles | July 23, 1935 |
| 2,049,126 | Maybach | July 28, 1936 |
| 2,078,161 | Rietsch | Apr. 20, 1937 |
| 2,301,543 | Hlavaty | Nov. 10, 1942 |
| 2,378,430 | Polsen | June 19, 1945 |